(12) United States Patent
Bench

(10) Patent No.: US 11,994,627 B2
(45) Date of Patent: May 28, 2024

(54) MICROSECOND TIME OF FLIGHT (μTOF) SENSOR

(71) Applicant: Artis, LLC, Herndon, VA (US)

(72) Inventor: Jared Bench, Herndon, VA (US)

(73) Assignee: Artis, LLC, Herndon, VA (US)

( * ) Notice: Subject to any disclaimer, the term of this patent is extended or adjusted under 35 U.S.C. 154(b) by 944 days.

(21) Appl. No.: 16/927,466

(22) Filed: Jul. 13, 2020

(65) Prior Publication Data

US 2021/0109194 A1   Apr. 15, 2021

Related U.S. Application Data

(60) Provisional application No. 63/030,009, filed on May 26, 2020, provisional application No. 62/873,721, filed on Jul. 12, 2019.

(51) Int. Cl.
 *G01S 7/487* (2006.01)
 *G01S 7/484* (2006.01)
 (Continued)

(52) U.S. Cl.
 CPC .............. *G01S 7/487* (2013.01); *G01S 7/484* (2013.01); *G01S 7/4863* (2013.01); *G01S 17/003* (2013.01); *G01S 17/10* (2013.01)

(58) Field of Classification Search
 CPC ........ G01S 7/487; G01S 7/484; G01S 7/4863; G01S 7/4815; G01S 7/4816;
 (Continued)

(56) References Cited

U.S. PATENT DOCUMENTS 6,031,601 A    2/2000 McCusker et al.
6,396,435 B1 * 5/2002 Fleischhauer ........... G01S 15/42
                                              342/72
(Continued)

FOREIGN PATENT DOCUMENTS

CN    111929661    11/2020
CN    113811792    12/2021

OTHER PUBLICATIONS

Samuel A. Shapero, "An analytic solution to ellipsoid intersections for multistatic radar," Proc. SPIE 10646, Signal Processing, Sensor/Information Fusion, and Target Recognition XXVII, 106461L (Apr. 27, 2018); doi:10.1117/12.2304836 (Year: 2018).*

(Continued)

*Primary Examiner* — Luke D Ratcliffe
(74) *Attorney, Agent, or Firm* — Nixon & Vanderhye P.C.

(57) ABSTRACT

An example μTOF is a flexible, small, sensor unit that uses modulated light to measure distance. The architecture of the sensor allows for many use cases. Use cases include the classic single emitter, single detector topology, but also include capability for operability as a full multi-input, multi-output (MIMO) system. In a MIMO configuration, the emitters and detectors can be arranged in a configuration similar to an RF antenna array or any number of other configurations from a single emitter/detector pair to vast dispersions of emitters and detectors. By coding the signal output by each emitter with a unique pseudo-noise (PN) or similar sequence, reflected signals received at the detector can be separated from each other, providing path distances between each emitter-detector pair. Given the robustness and noise immunity of PN sequences, this approach works well even with signal levels well below the noise floor. Using the measured path distances from each sensor to each (Continued)

μToF system block diagram.

emitter, the locations of objects in the scene can be extracted by triangulation.

20 Claims, 9 Drawing Sheets

(51) Int. Cl.
    *G01S 7/4863*     (2020.01)
    *G01S 17/00*     (2020.01)
    *G01S 17/10*     (2020.01)

(58) Field of Classification Search
    CPC ...... G01S 7/4865; G01S 17/003; G01S 17/10; G01S 17/48; G01S 17/87; G01S 17/08
    See application file for complete search history.

(56) References Cited

U.S. PATENT DOCUMENTS

| | | | |
|---|---|---|---|
| 6,522,288 B1* | 2/2003 | Paradie | G01S 13/46 |
| | | | 342/146 |
| 6,664,918 B2* | 12/2003 | Paradie | G01S 13/931 |
| | | | 342/146 |
| 2006/0114146 A1* | 6/2006 | Lindenmeier | G01S 13/931 |
| | | | 342/146 |
| 2009/0092284 A1* | 4/2009 | Breed | G01S 7/4802 |
| | | | 382/103 |
| 2015/0091872 A1* | 4/2015 | Worfolk | G06F 3/04162 |
| | | | 345/175 |
| 2016/0112696 A1* | 4/2016 | Dielacher | G01S 17/08 |
| | | | 348/46 |
| 2017/0329010 A1 | 11/2017 | Warke et al. | |
| 2021/0356597 A1 | 11/2021 | Ephraim | |

OTHER PUBLICATIONS

Lee, J., Kim, YJ., Lee, K. et al. Time-of-flight measurement with femtosecond light pulses. Nature Photon 4, 716-720 (2010). https://doi.org/10.1038/nphoton.2010.175 (Year: 2010).*

International Search Report and Written Opinion (PCT/ISA/220, PCT/ISA/210, & PCT/ISA/237) issued in PCT Application No. PCT/US2020/041806 dated Oct. 19, 2020 (15 pages).

Chawla et al., "Parallel Acquisition of PN Sequences in DS/SS Systems", IEEE Transactions on Communications, May 1994, pp. 2155-2164, vol. 42, No. 5 (10 pages).

* cited by examiner

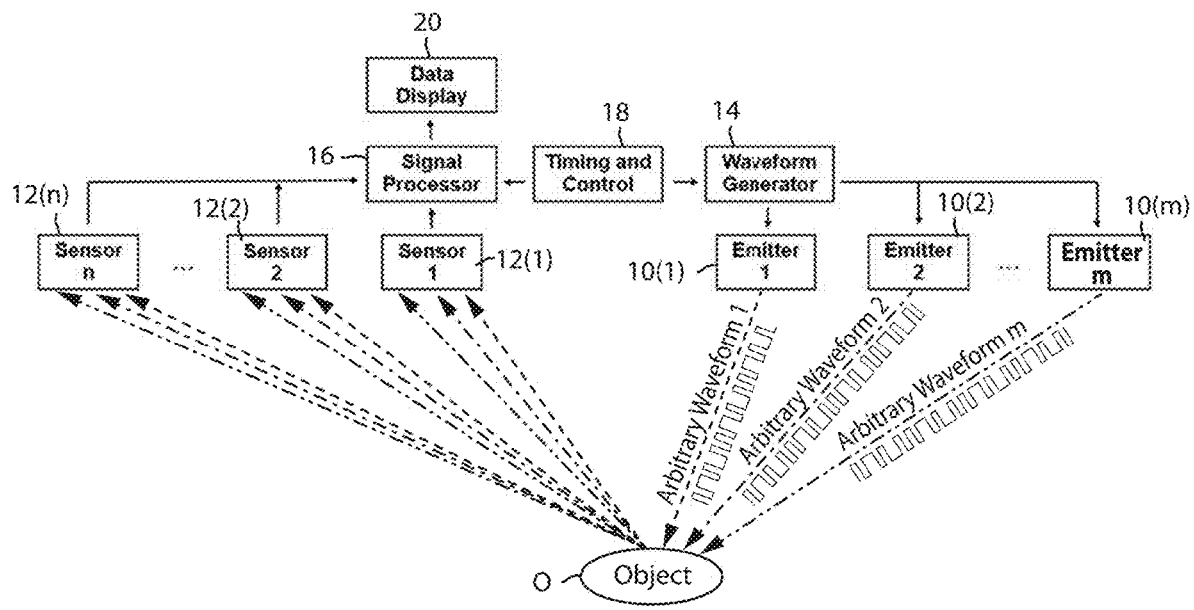
Figure 1: uToF system block diagram.
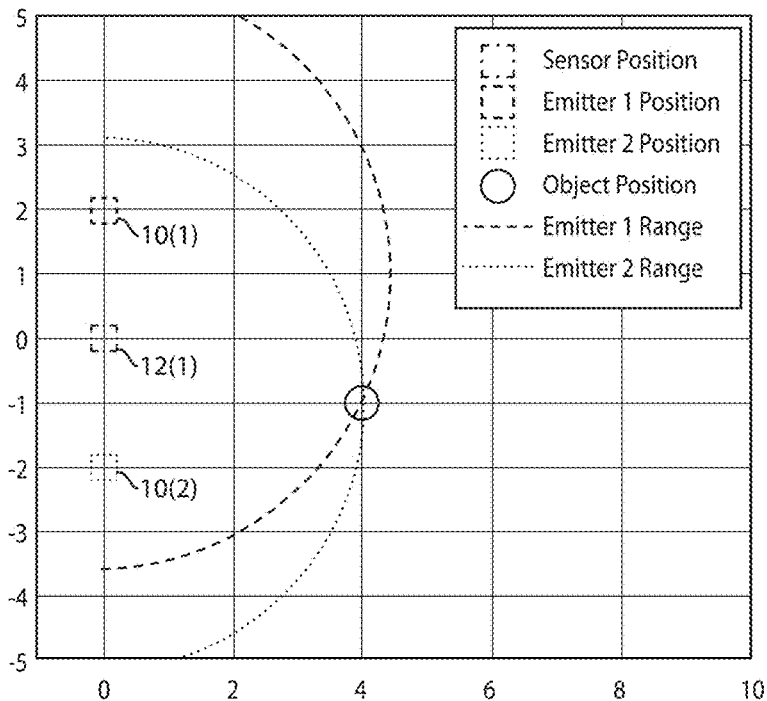
Figure 2: Simple uToF sensing scheme with 2 emitters, 1 sensor, and 1 object.

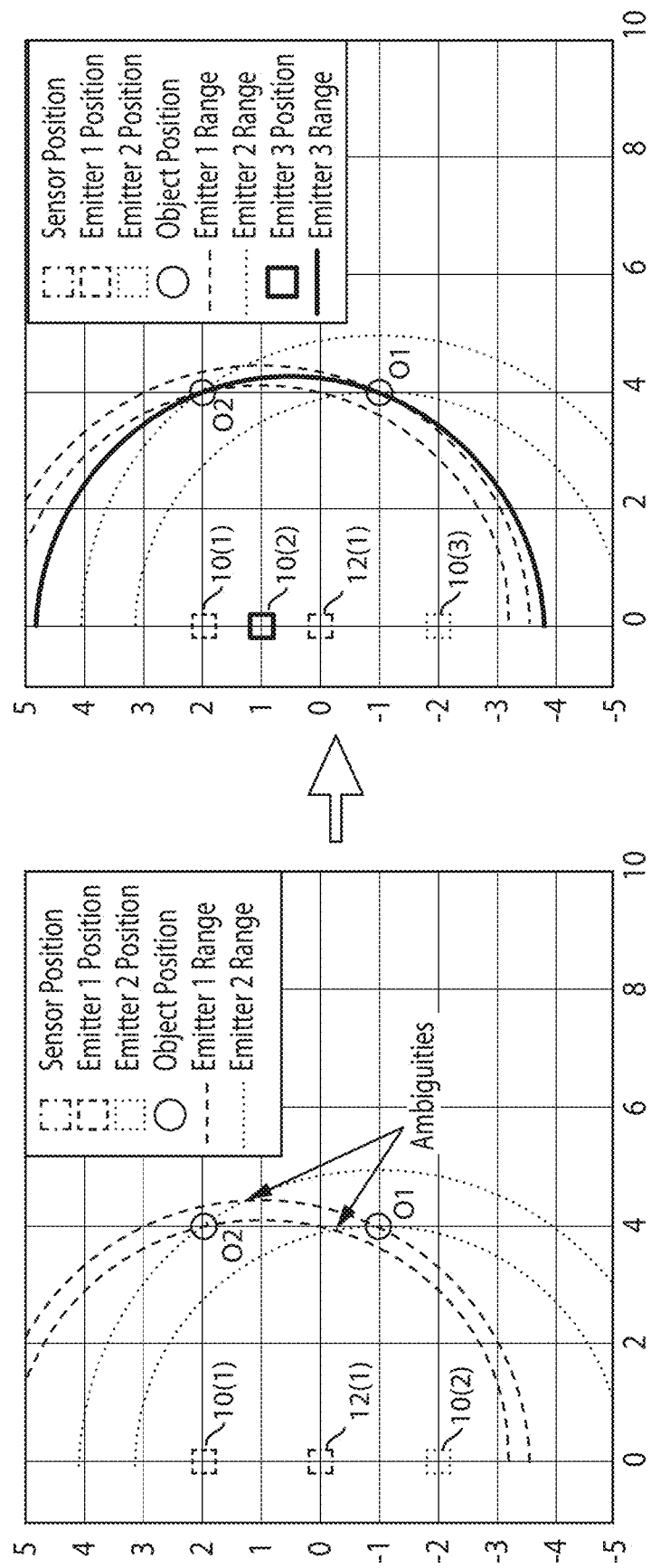
Figure 3: Creation and resolution of ambiguities for 2 objects.

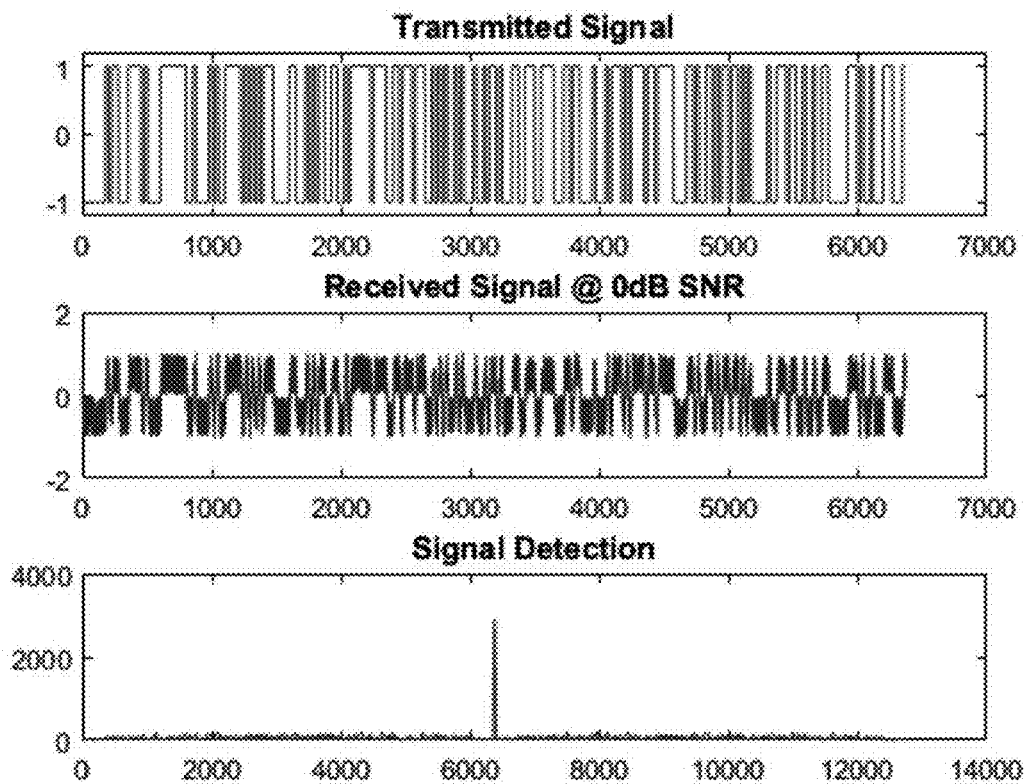
Figure 4: Transmitted and received signals with detection peak for 0dB SNR
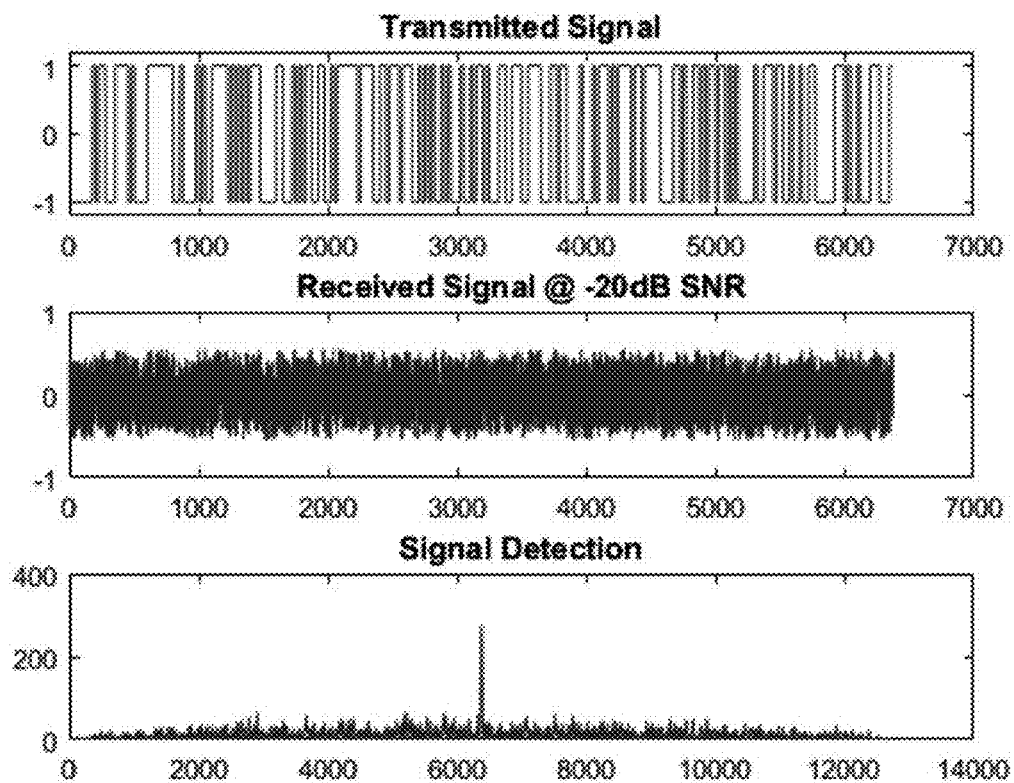
Figure 5: Transmitted and received signals with detection peak for -20dB SNR

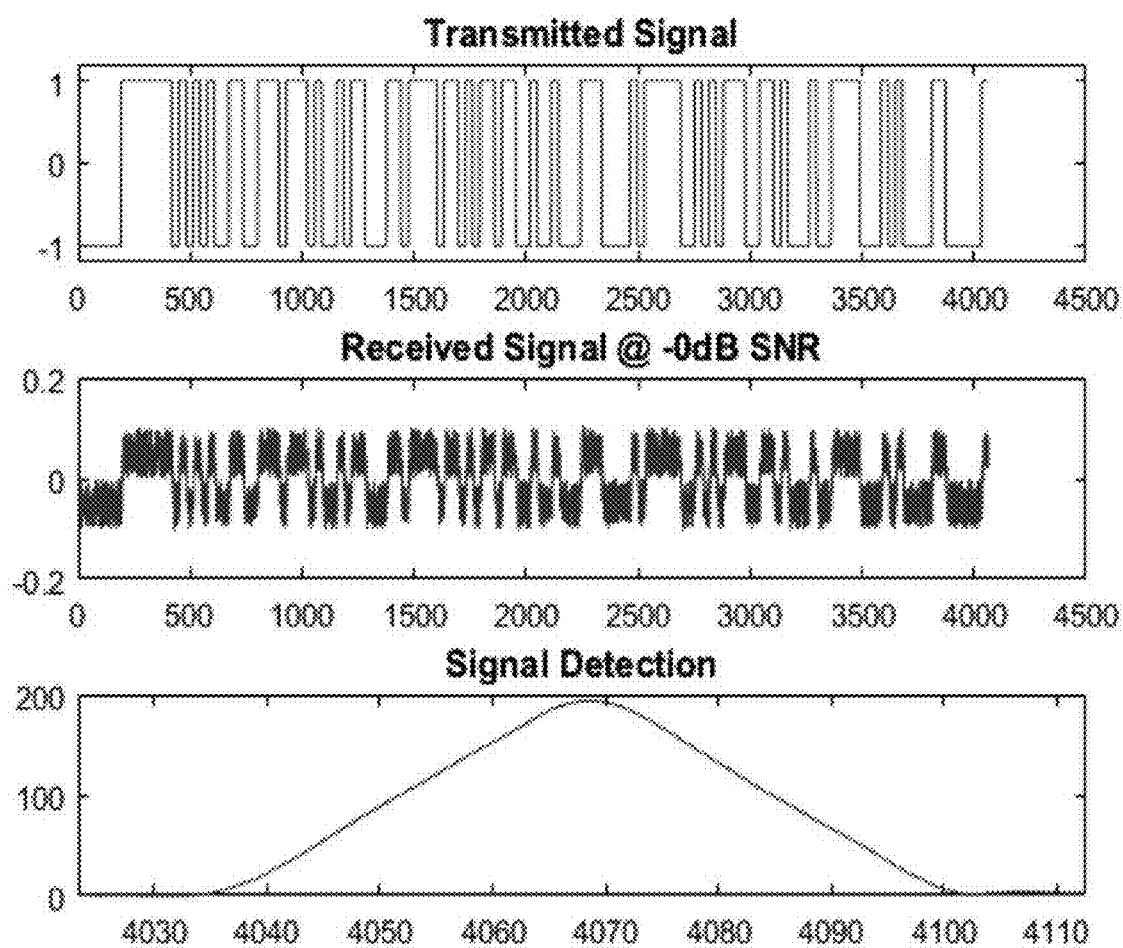
*Figure 6: Transmitted and received signals showing zoomed detection peak.*

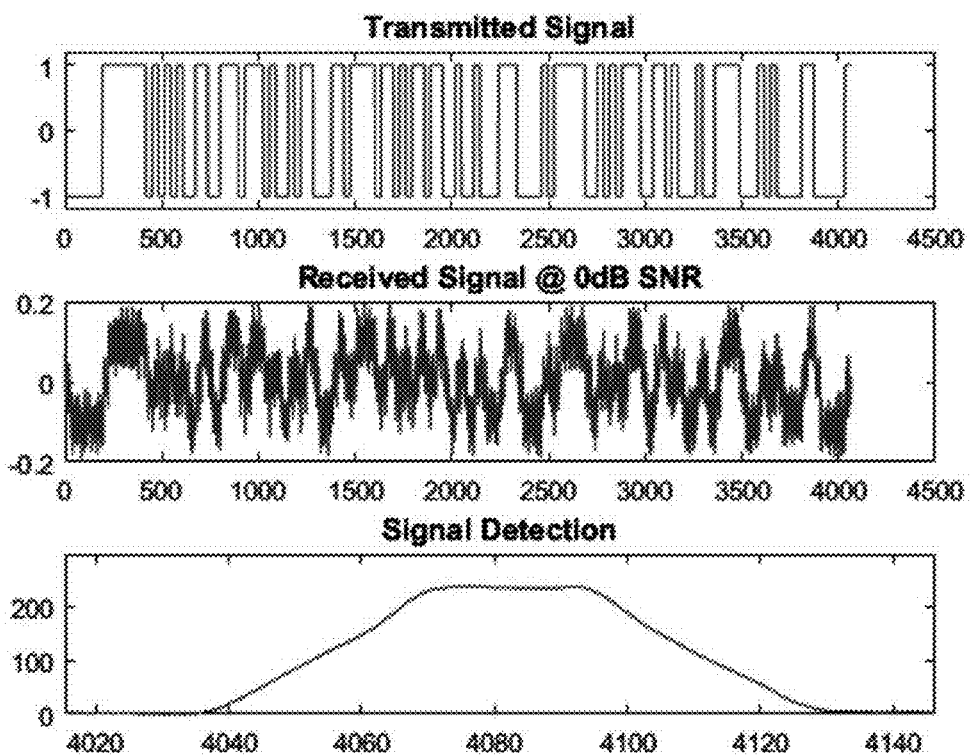
*Figure 7: Received signal and detection for two closely spaced simultaneous*
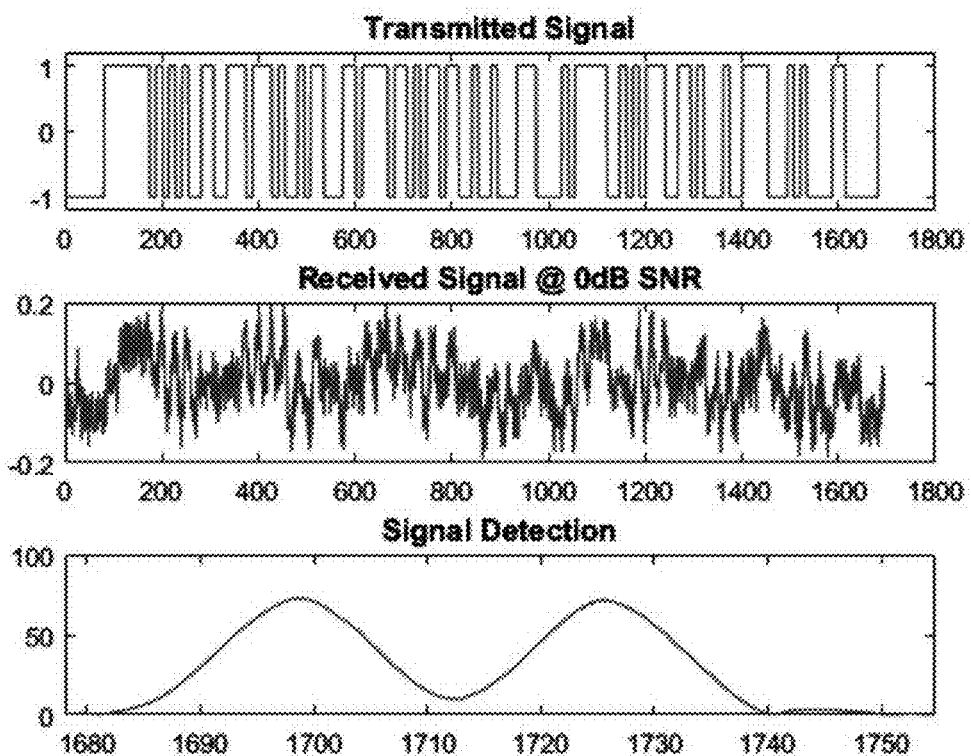
*Figure 8: Received signal and detection for two closely spaced simultaneous returns with a 150MHz modulation frequency.*

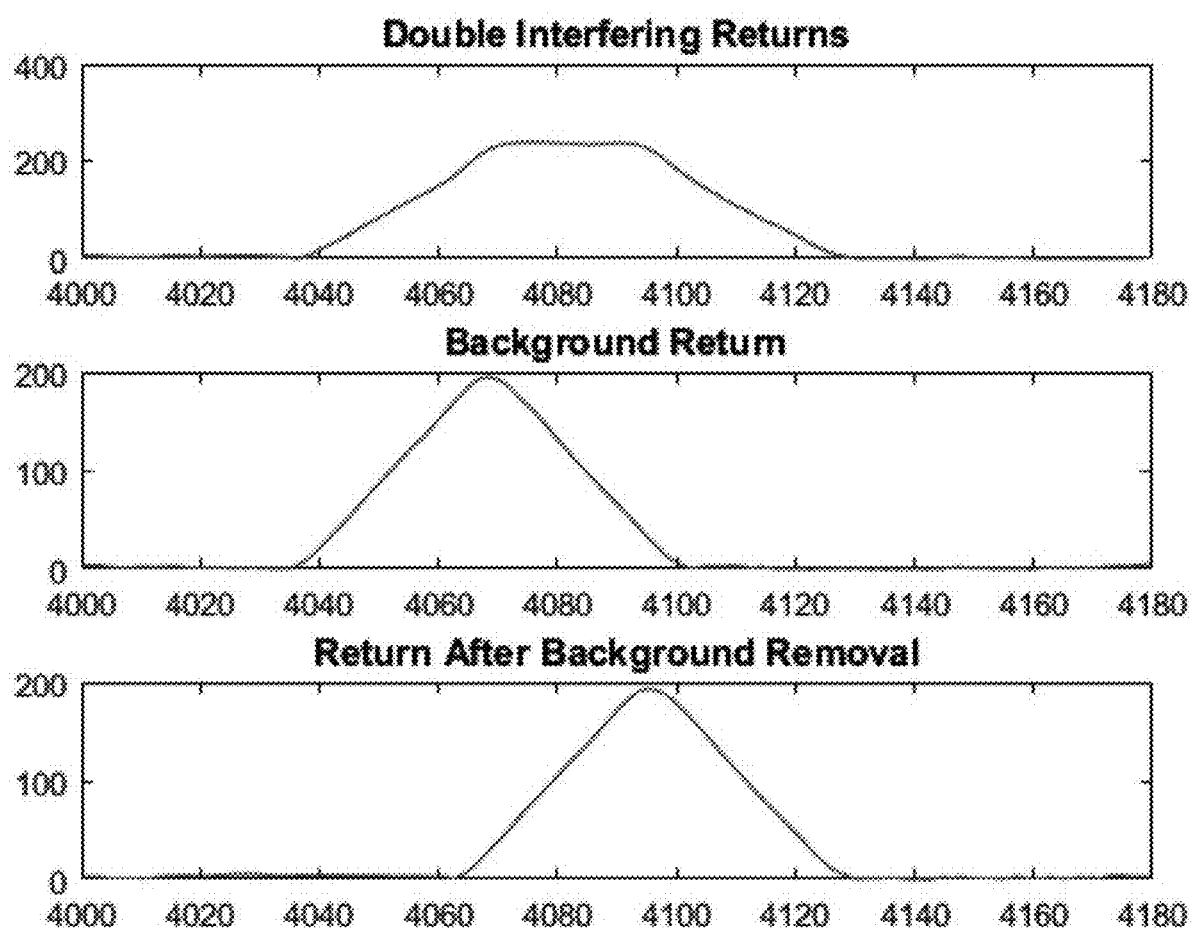
*Figure 9: Background removal for two interfering peaks.*

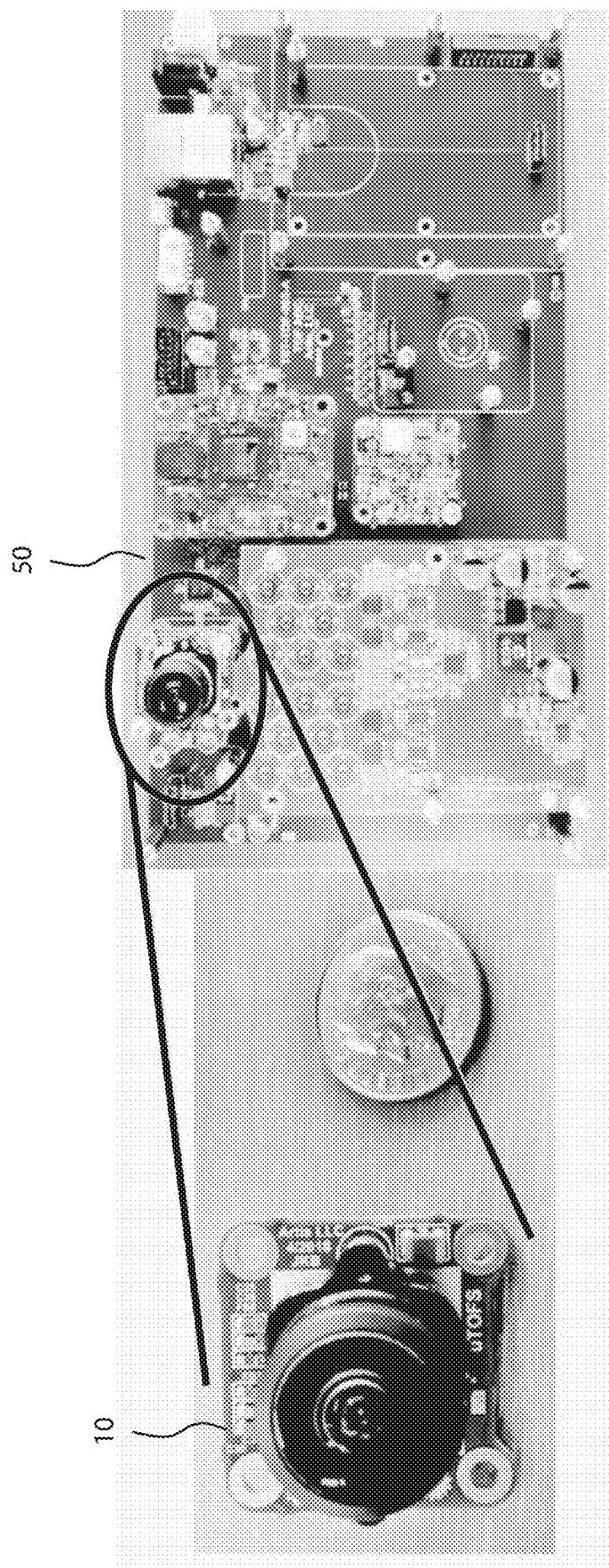
Figure 10: μTOF dev kit on right and actual sensor on left

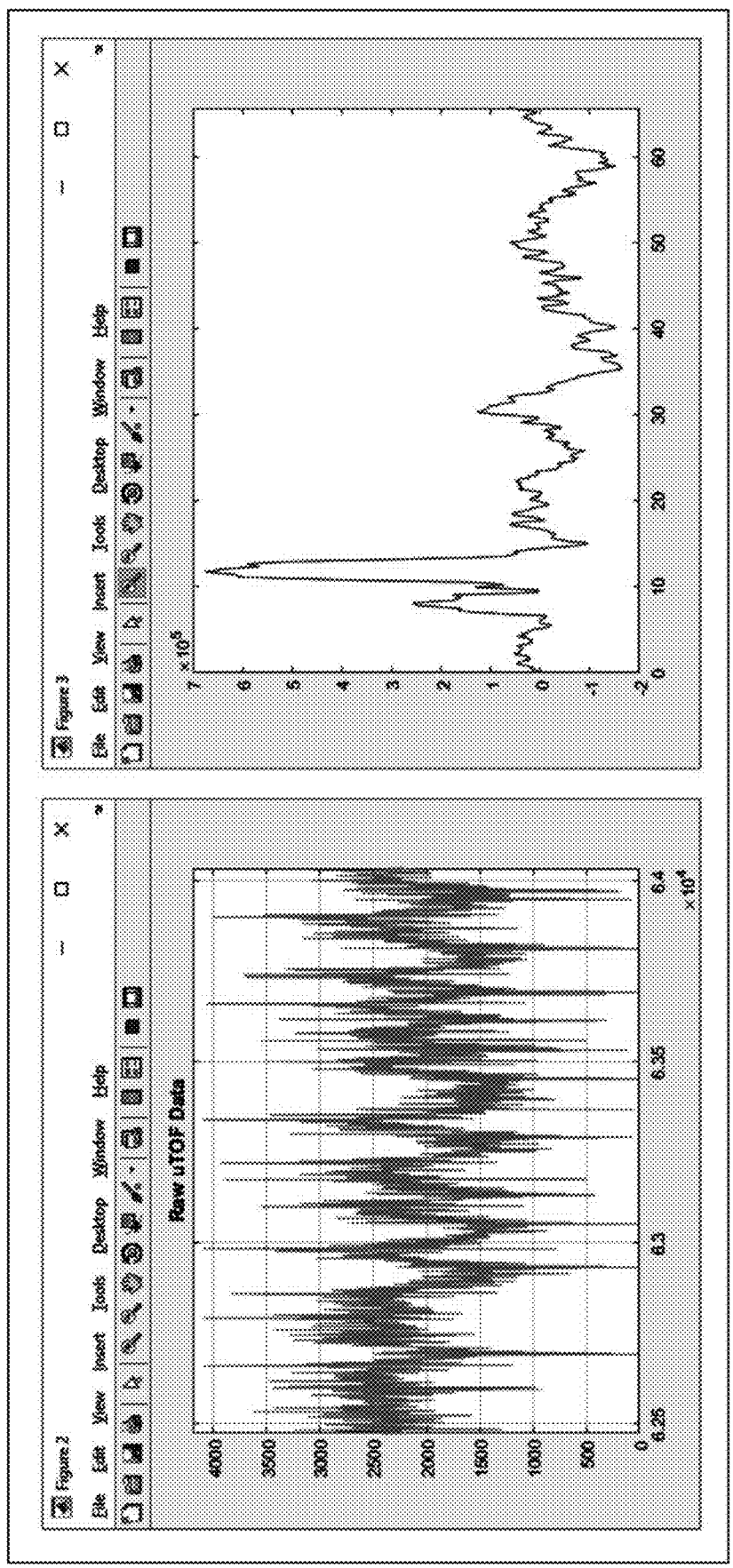
*Figure 11: Raw signal from μTOF on left. Processed signal on right showing object at approximately 11 meters range, along with 1 to 2 other smaller returns.*

MICROSECOND TIME OF FLIGHT (μTOF) SENSOR

CROSS-REFERENCE TO RELATED APPLICATION

This application claims priority from U.S. Provisional Patent Application Nos. 62/873,721, filed Jul. 12, 2019, and 63/030,009, filed May 26, 2020, and are incorporated herein in their entirety by reference.

FIELD

The technology herein relates to a new type of sensor that is uniquely designed for detecting fast-moving objects in space. Still more particularly, the technology herein relates to a Microsecond Time-of-Flight (μTOF) sensor that uses sensor technology employed by modern cell phones and GPS to pull weak signals from multiple sources in a noisy environment.

BACKGROUND & SUMMARY

LIDAR Concepts and Typical LIDAR Approaches

A LIDAR (Light Detection and Ranging) or TOF (time of flight) sensor is a 3D scanning technique used to measure distance to an object. LIDAR works by illuminating an object with a narrow column of light, and then measuring the reflection in a particular way. The light scattered by the object is detected by a photodetector, which can be a single pixel or array. Distance can be calculated by measuring the time of flight for the light to travel to the object and back.

Typically, LIDAR are characterized as either pulsed or continuous wave (CW).

Pulsed LIDAR is a somewhat brute force approach to distance measurement. The illumination consists of a single, high-amplitude, short pulse of light. After emitting a pulse, the detector circuit is monitored for reception of the reflected pulse. This technique has the advantage of being relatively simple. However, because the detector is looking for a short pulse of light, performance can degrade significantly in the presence of other LIDARs or in noisy environments. In addition, as the reflectivity and distance of the object varies, pulse amplitudes can vary wildly. Due to finite pulse rise times, this can create errors in the time of flight measurement, known as walk error. Such errors can be reduced via a variety of techniques, such as specialized signal conditioning circuitry or by measuring and compensating for the return pulse amplitude.

Continuous wave (CW) TOF sensors use an indirect distance measurement approach. Instead of transmitting a single pulse of light, CW LIDARs transmit a continuous train of pulses. The emitted waveform can take many shapes, to include sinusoidal or square waves. By measuring the phase difference between the emitted and received signal, distances can be calculated. This approach has better mutual interference and noise performance because the detection space can be narrowed to a single frequency and observed over many pulses. However, the repeating nature of the signal creates distance ambiguities in measurements that are dependent on modulation frequency. Under high ambient conditions, measurements also begin to show some contrast decay, limiting sensitivity and accuracy.

For both pulsed LIDAR and CWTOF approaches, it is necessary to consider how the system will be extended beyond a single pixel. For LIDAR, this is typically done by physical scanning a single emitter/detector pair over a field of view or by using an array of multiple emitters and/or detectors. Scanning makes use of mechanically rotating mirrors, MEMs actuators, or other laser steering technologies, and tends to be too slow to track fast moving objects. CWTOF lends itself better to use with a single emitter and array of detectors. This is due to the ability to easily integrate RF mixing technology onto a typical CMOS or CCD imager chip and integrate returns over time. Because of this, detector arrays for CWTOF tend to scale better in cost, size, and power than their pulsed LIDAR counterparts. However, sample rates are still limited by array readout times and integration times, which are limited. They are also very challenged in high ambient light conditions such as direct sunlight.

BRIEF DESCRIPTION OF THE DRAWINGS

FIG. 1 shows an example non-limiting uTOF system block diagram.

FIG. 2 shows an example non-limiting simple uTOF sensing scheme with two emitters, one sensor and one object.

FIG. 3 shows example non-limiting creation and resolution of ambiguities for two objects.

FIG. 4 shows example non-limiting transmitted and received signals with detection peak for 0 dB signal-to-noise ratio.

FIG. 5 shows example non-limiting transmitted and received signals with detection peak for −20 dB signal-to-noise ratio.

FIG. 6 shows example non-limiting transmitted and received signals showing a zoomed detection peak.

FIG. 7 shows an example non-limiting received signal and detection for two closely spaced simultaneous signals.

FIG. 8 shows an example non-limiting received signal and detection for two closely spaced simultaneous returns with a 150 MHz modulation frequency.

FIG. 9 shows example non-limiting background removal for two interfering peaks.

FIG. 10 shows example non-limiting uTOF development kit on right and actual sensor on left.

FIG. 11 shows example non-limiting raw signal from uTOF on left, processed signal on right showing object approximately 11 meters range, along with 1 to 2 smaller returns.

DETAILED DESCRIPTION OF EXAMPLE NON-LIMITING EMBODIMENTS

Figure 12:
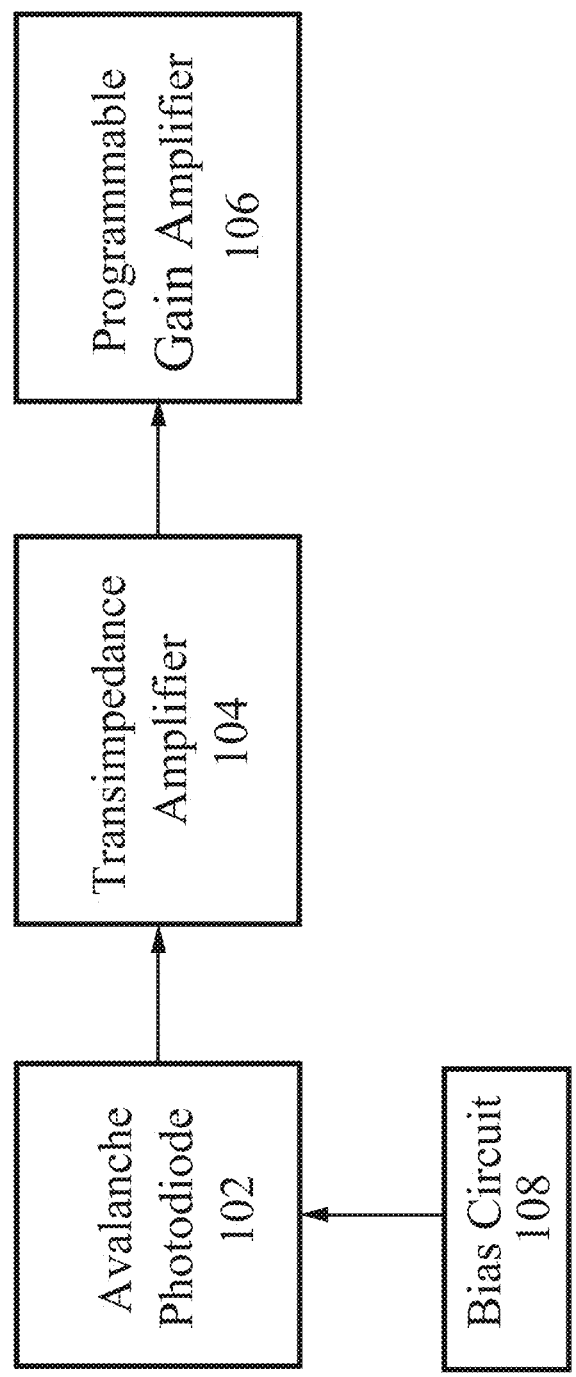
FIG. 12 shows an example embodiment of a sensor input signal processing circuit.

An example μTOF sensor system includes a flexible, small, sensor unit that uses modulated light to measure distance. The architecture of the sensor allows for many use cases. Use cases include the classic single emitter, single detector topology, but also include capability for operability as a full multi-input, multi-output (MIMO) system. In a MIMO configuration, the emitters and detectors can be arranged in a configuration similar to an RF antenna array or any number of other configurations from a single emitter/detector pair to vast dispersions of emitters and detectors.

By coding the signal outputted by each emitter with a unique pseudo-noise (PN) or similar sequence, reflected signals received at the detector can be separated from each other, providing path distances between each emitter-detector pair. A pseudo-noise (PR) code or pseudo-random noise (PRN) code generally speaking has a spectrum similar to random noise but is deterministically generated. See e.g., Kurpis et al, IEEE Std. 100; The New IEEE Standard Dictionary of Electrical and Electronic Terms 1993). Such codes have been used for example in direct spread spectrum transmission and reception. See e.g., Chawla et al, Parallel Acquisition of PN Sequences in DS/SS Systems, IEEE Transactions on Communications Vol. 42, No. 5 (May 1994). Given the robustness and noise immunity of common PN sequences, this approach works well even with signal levels well below the noise floor. Using the measured path distances from each sensor to each emitter, the locations of objects in the scene can be extracted by triangulation.

The system can work with N emitters. The more emitters one has, the better the spatial resolution. Two sensors is a minimum for determining a location (X, Y) on a line (two dimensions), and 3 sensors is a minimum for determining a location (X, Y, Z) in 3D space. But if you had 1,000 emitters then you could probably determine where something is to within several wavelengths of light, yielding tremendous accuracy. It is not possible to do this with a normal LIDAR since the multiple beams would interfere with each other. It is this ability to process PN codes that allows massive numbers of emitters to be used.

The PN codes allow the system to discriminate the signal from background noise and clutter, not only discriminate the signal from other emitters. This is extremely powerful in that LIDARs are limited by eye safety concerns, which grossly limits their range. With our novel approach you can increase range by a factor of maybe 100 or more. It really depends on how long of a PN sequence you want to emit and how good your processing is. But what we're proposing is nothing short of a revolution in LIDARs. Imagine how it would change autonomous vehicles if one could accurately determine objects at 2 km rather than the 200 meters of today's best LIDARs.

Example μTOF System Architecture

Instead of a single pulse or sinusoidal wave as described in the approaches above, a μTOF emitter outputs an arbitrary waveform that is unique. This vastly improves noise rejection due to mutual interference and other sources as compared with the pulsed approach. It also improves upon the noise rejection characteristics of the CW approach and greatly extends the unambiguous range. In addition, this allows a single pixel photodiode or similar light sensor to simultaneously receive reflected signals from multiple emitters.

Depending on arbitrary waveform design, significant processing SNR (signal to noise ratio) gains can be achieved, clearly extracting signals that are 20 dB below the noise floor or more.

A μTOF system can be scaled up to an arbitrarily large number of sensors and emitters if modulated signals are designed to have sufficient orthogonality. In addition, the emitters and detectors can be physically separated from each other along different axes. This separation creates a geometric diversity that can be used to triangulate the locations of individual objects in the scene.

The conventional GPS system works on somewhat similar principles. A GPS receiver simultaneously receives a unique RF waveform from each of several satellites in view. Essentially, by de-correlating these waveforms, a time-of-flight is computed to each satellite. Knowing the location of each satellite allows the receiver to triangulate its own position. However, GPS operates at L1 (1575.42 MHz) and L2 (1227.60 MHz)—not at light frequencies. However, similarly to a GPS system, a μTOF system could consist of any number of transmitting and receiving nodes to form a mesh grid.

The components of a μTOF system are shown in FIG. 1 and are made up of the following in one embodiment:

Emitter(s) 10(1), 10(2), . . . , 10(m). Each emitter is capable of transmitting an arbitrary waveform at an appropriate power level and modulation frequency.

Sensor(s) 12(1), 12(2), . . . , 12(n). Each sensor contains a photo sensitive element with appropriate sensitivity and frequency response to detect signals reflected from the scene.

Waveform generator 14. A circuit or a processor that generates arbitrary waveforms and controls modulation of emitters.

Signal processor system 16. A processor responsible for digitizing and processing the received signals observed at each sensor. The sample rate, resolution, and bandwidth is appropriate to capture any signals of interest.

Timing and control system 18. A circuit that contains logic to supervise timing and control of emitters, sensors, signal processor, waveform generator, and other subsystems.

Assuming the received signal can be sampled at sufficient speed, the scan rate for this architecture is limited only by the modulation frequency, the length of the arbitrary waveform, and how long it takes to process information from the scene.

The simplest example of a MIMO μTOF system consists of two emitters 10(1), 10(2) and a single sensor 12(1). Positioning these three elements in a single line enables 2D sensing along a single plane. FIG. 2 illustrates how these sensors might be positioned relative to each other. A single object O is shown, along with curves representing the measured path length for each sensor-emitter pair (i.e., emitter 10(1) to sensor 12(1), and emitter 10(2) to sensor 12(1)). The signals emitted by the two emitters 10(1), 10(2) are coded in such a way that sensor 12(1) can tell them apart. The location of the object O is determined by finding the intersection of the two paths.

For a slightly more complex system with two objects in the scene, ambiguities can occur, as shown in FIG. 3. In the left side of this figure, the two received object ranges create four possible intersection points, only two of which are valid. One way the ambiguity can be resolved is by adding another sensor—emitter pair such as shown in the right side of FIG. 3. Other techniques also exist for resolving these ambiguities.

Creation and Resolution of Ambiguities for 2 Objects.

Additionally, the sensing space can be extended from 2D to 3D by adding more sensors or emitters to the system. To extend sensing capabilities to three dimensions, sensors and/or emitters are added along the other dimension. As more sensors and emitters are added, the system gains more ambiguity resolving capability in the presence of increasingly complex scenes.

Signal Processing And Distance Calculation

The arbitrary waveform and direct signal sampling provide significant processing signal gains Noise immunity, sensitivity, maximum sensing distance, and power requirements all improve as the waveform increases in length. FIGS. 4 & 5 show how a received signal can be processed to find the signal of interest, even in the presence of noise. FIG. 4 and FIG. 5 correspond to SNR levels of 0 dB and −20 dB, respectively, for a 255-chip PN sequence. The location of the peak in the Signal Detection section corresponds to the time of flight for a reflected signal in the scene. In both cases, a clear peak is detected with very little noise or side lobes present.

In a cluttered environment, multiple peaks will exist. In one embodiment, these individual peaks are matched between sensor-emitter pairs to properly triangulate locations of objects in the scene. Many such algorithms already exist and have been in used in the RF world to extract angle of arrival and time of arrival information from an antenna array.

Additionally, by limiting the geometry to sensing along a single line and focusing on a small number of high-speed objects, the matching algorithms are significantly simplified. Static background returns can also be removed from consideration.

One technical aspect of one embodiment of the system is to characterize the returning waveform from a pulse train. There are many approaches for accomplishing this. One example method, simulated below as an example, is to sample the wave with a high-speed ADC (analog to digital converter) to measure it directly. There are many other approaches as well, from interferometry, under-sampling with statistical analysis, phase-shifting of the P/N sequence and so forth.

Example Simulation

A Matlab simulation of the µTOF sensor has been performed to verify some of the concepts discussed above. The following assumptions were made for system parameters:

PN Code Chip Frequency: 62.5 MHz
PN Code Length: 127 chips
ADC Sample Rate: 500 MSa/s
PN Code Repetitions: 4
ADC Effective Sample Rate: 2 GSa/s
Received Signal Level Peak: +/−50 mV
ADC Resolution: 12 bits These assumptions would give a pixel measurement rate of about 500 kHz if measurements are processed on a rolling basis and an unambiguous range of 307 m. FIG. 6 shows that zooming in on the cross-correlation peak, we see that it is about 3 ns wide at 95% of the peak amplitude. This corresponds to about 45 cm and limits our ability to resolve the peaks of multiple simultaneous returns.

For example, assuming a second return located 2 m from the first, FIG. 7 shows that the peaks tend to constructively interfere with each other in a way that makes it difficult to distinguish two discrete peaks. This problem is greatly reduced with a higher chip rate, processing of additional samples, waveform pattern matching and other approaches. FIG. 8 shows the same double return scenario with a chip rate of 150 MHz. At the higher modulation frequency, the peaks are separated and easy to resolve from each other. Additionally, if the second object corresponds to a static background object, a background subtraction can be performed to remove the second peak, as shown in FIG. 9.

Example µTOF Components

To test out these sensing concepts, a modular prototyping backplane (development kit shown in FIG. 10) has the ability to swap out different hardware modules. Components include:

µTOF Controller 50: Consists of a backplane with connectors and interfaces to mount and control submodules. Includes a high-speed ADC, capable of 500 MSa/s sampling at 12-bit resolution, and a processor system on chip (SoC).

Optical Sensor 10 (see left-hand side of FIG. 10): In one embodiment, a 27 mm×27 mm module that contains a single avalanche photodiode and analog front-end circuitry. Includes multiple gain stages, which are adjustable and allow for dynamically changing amplification levels. There are three stages of amplification. The avalanche photodiode 102 (see FIG. 12) itself produces gains up to 200× by adjusting the bias voltage, using 4096 steps of adjustment. The next gain stage is a transimpedance amplifier 104 with a gain of 4.7 kV/A. This transforms the current output of the photodiode into a voltage. See e.g., Lau et al, Excess Noise Measurement in Avalanche Photodiodes Using a Transimpedance Amplifier Front End, Meas. Sci. Technol. 17, 1941-1946 (2006).

A programmable gain amplifier 106 allows further gains ranging from 0.9 V/V to 87 V/V. The FIG. 12 circuitry yields a total dynamic range from 4.2 kV/A to 81,800 kV/A in nearly continuously variable gain steps. The analog bandwidth of one embodiment of the circuitry is about 520 MHz, and is capable of capturing fast moving light pulses as they arrive at the detector. In one embodiment, the sensor also holds an M12 lens mount, allowing the flexibility of low-cost COTS M12 lenses.

Avalanche Photodiode Bias Circuit 108: In one embodiment, the bias circuit is a 29 mm×29 mm module that steps up voltage at the 24V input to a high voltage that is used to bias the photodiode. Accurate current monitoring circuitry is integrated into the board along with over-current and shut-down protection.

Emitter 10: Contains a series of LEDs or lasers that are modulated at a high rate with a PN sequence. The circuits were designed to be flexible to allow adjustment of peak power and modulation frequency during the prototyping process. The current emitter allows modulation up to 62.5 MHz.

Example Performance

Initial example results are shown in FIG. 11. The PN codes have been successfully emitted, returned and processed at frequencies up to 62.5 MHz. The raw signal is shown on the left and is typical of a PN sequence. The processed signal on the right clearly shows a peak at the distance of the test object, about 11 meters away. Currently, the development focus is on collecting and analyzing data from high-speed projectiles in both laboratory and test range scenarios. In addition, signal processing algorithms and finding optimal emitter/receiver geometries area ongoing and continuing to be refined based on feedback from testing.

All patents and publications cited herein are expressly incorporated by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A distance measuring method comprising:
   (a) emitting, from a first emitter, a first optical signal coded with a first PN encoding;
   (b) emitting, from a second emitter, a second optical signal coded with a second PN encoding different from the first PN encoding;
   (c) receiving, by a sensor physically separated from the first and second emitters, the first and second optical signals reflected from an object;
   (d) discriminating between the first PN encoding and the second PN encoding to discriminate between the first and second optical signals received by the sensor;

(e) performing time of flight calculations based on the received first and second optical signals discriminated for the sensor; and (f) using results of the time of flight calculations to determine location of the object.

2. The distance measuring method of claim 1 including receiving with a photodiode.

3. The distance measuring method of claim 2 wherein the photodiode comprises an avalanche photodiode.

4. The distance measuring method of claim 1 wherein performing time of flight calculations comprises determining differences between time of flight of the first optical signal and time of flight of the second optical signal.

5. The distance measuring method of claim 1 further comprising removing background from the received first and second optical signals.

6. The distance measuring method of claim 1 further including resolving ambiguities in the time of flight calculations for reflection from multiple objects.

7. The distance measuring method of claim 1 further including emitting a third PN-encoded optical signal from a third emitter, receiving the third PN-encoded optical signal at the sensor, and using the time of flight of the received first, second and third optical signals to resolve location of the object in three dimensions.

8. The distance measuring method of claim 1 further including characterizing returning signal waveforms from a pulse train.

9. The distance measuring method of claim 1 including providing a chip rate of at least 60 MHz.

10. A distance measuring system comprising:
a first emitter configured to emit a first optical signal coded with a first PN encoding;
a second emitter configured to emit a second optical signal coded with a second PN encoding different from the first PN encoding;
a first optical sensor configured to receive the first and second optical signals reflected from an object,
a second optical sensor configured to receive the first and second optical signals reflected from the object, and
at least one circuit connected to the first and second optical sensors, the at least one circuit being configured to discriminate between the first PN encoding and the second PN encoding, and
at least one processor connected to the at least one circuit, the at least one processor configured to perform time of flight calculations on the first and second optical signals received by each of the first and second optical sensors to determine location of the object.

11. The distance measuring system of claim 10 wherein the first optical sensor and the second optical sensor each comprise a photodiode.

12. The distance measuring system of claim 11 wherein the photodiodes comprise avalanche photodiodes.

13. The distance measuring system of claim 10 wherein the at least one circuit is configured to determine coincidence between time of flight of the first optical signal and time of flight of the second optical signal.

14. The distance measuring system of claim 10 wherein the at least one circuit is configured to remove background from the received first and second optical signals.

15. The distance measuring system of claim 10 wherein the at least one circuit is configured to resolve ambiguities in the time of flight calculations for reflection from multiple objects.

16. The distance measuring system of claim 10 further including a third emitter configured to emit a third PN-encoded optical signal, the first and second optical sensors are each configured to receive the third optical signal, and the at least one circuit is configured to use the time of flight of the received first, second and third optical signals to resolve location of the object in three dimensions.

17. The distance measuring system of claim 10 wherein the at least one circuit is further configured to characterize returning signal waveforms from a pulse train.

18. The distance measuring system of claim 10 wherein the first and second emitters are each configured to provide a PN chip rate of at least 60 MHz.

19. A sensing system comprising:
at least two sensors for determining a location (X, Y) on a line (two dimensions), or at least 3 sensors for determining a location (X, Y, Z) in 3D space;
N PN coded emitters, where N is any integer greater than 1, configured to enable the system to determine location of an object to within several wavelengths of light, yielding accuracy by processing PN codes that allows many emitters to be used; and
a controller connected to the at least two sensors, the controller configured to use a first PN encoding emitted by a first of the N PN coded emitters and a second PN encoding emitted by a second of the N PN coded emitters to discriminate between the first and second optical signals received by the first sensor, and based on the received first and second optical signals discriminated for the first sensor, performing time of flight calculations and using results of the time of flight calculations to determine a location of the object.

20. The system of claim 19 wherein the system is configured to use the PN codes to discriminate the signal from background noise and clutter, allowing an increase in range by a factor of at least 100 as compared to conventional LIDAR.

* * * * *